(12) United States Patent
North et al.

(10) Patent No.: US 11,513,936 B2
(45) Date of Patent: Nov. 29, 2022

(54) COMPUTING DEVICE APPLICATION PERFORMANCE OPTIMIZATION SYSTEM

(71) Applicant: Dell Products L.P., Round Rock, TX (US)

(72) Inventors: Travis C. North, Cedar Park, TX (US); Michael James Pescetto, Round Rock, TX (US); Jacob Vick, Leander, TX (US); Philip Joseph Grossmann, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/243,777

(22) Filed: Apr. 29, 2021

(65) Prior Publication Data

US 2022/0350720 A1 Nov. 3, 2022

(51) Int. Cl.
| | |
|---|---|
| *G06F 9/44* | (2018.01) |
| *G06F 11/34* | (2006.01) |
| *G06N 20/00* | (2019.01) |
| *G06F 8/61* | (2018.01) |
| *G06Q 30/06* | (2012.01) |

(52) U.S. Cl.
CPC ........... *G06F 11/3409* (2013.01); *G06F 8/61* (2013.01); *G06N 20/00* (2019.01); *G06Q 30/0631* (2013.01); *G06Q 30/0633* (2013.01)

(58) Field of Classification Search
CPC .................................................. G06F 11/3409
USPC .......................................................... 719/320
See application file for complete search history.

(56) References Cited

U.S. PATENT DOCUMENTS

| | | | | |
|---|---|---|---|---|
| 2011/0145657 | A1* | 6/2011 | Bishop | H04L 43/04 714/47.1 |
| 2014/0228108 | A1* | 8/2014 | Bruno, Jr. | G07F 17/3234 463/29 |
| 2018/0232321 | A1* | 8/2018 | Akyildiz | G06F 1/32 |
| 2018/0296922 | A1* | 10/2018 | Argintaru | A63F 13/50 |

\* cited by examiner

*Primary Examiner* — Timothy A Mudrick
(74) *Attorney, Agent, or Firm* — Joseph Mencher

(57) ABSTRACT

A networked system includes a first computing device, second computing devices, and a computing device/application performance optimization system that are all coupled to a network. The computing device/application performance optimization system receives second computing device configuration information for each second computing device while they provided a first application, and second computing device performance information generated by each second computing device in response to providing the first application, and uses them to generate a first computing device/application performance profile. When the computing device/application performance optimization system determines that the first computing device is configured to provide the first application, it generates a first computing device configuration communication that includes at least one first configuration change to a first computing device configuration for the first computing device based on the first computing device/application performance profile, and transmits the first computing device configuration communication to the first computing device.

20 Claims, 17 Drawing Sheets

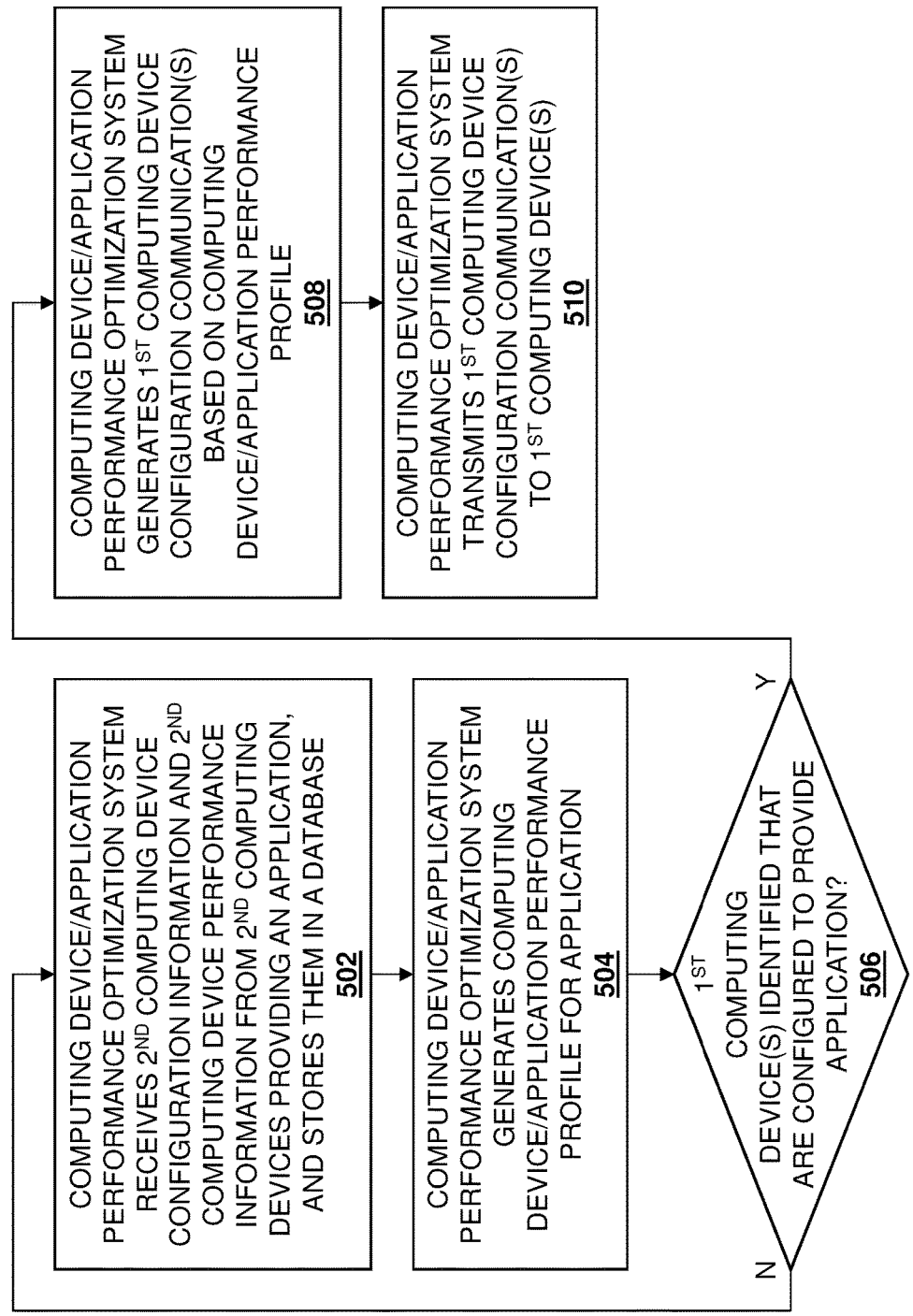

COMPUTING DEVICE APPLICATION PERFORMANCE OPTIMIZATION SYSTEM

BACKGROUND

The present disclosure relates generally to information handling systems, and more particularly to optimizing the performance of applications by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are utilized to perform relatively system-intensive workloads that may require different system components and/or system settings in order to operate optimally. For example, relatively high-performance desktop computing devices and/or laptop/notebook computing devices are often utilized to provide gaming applications, and the optimization of the performance of those gaming applications by those computing devices (e.g., at runtime) is critical to ensure the best experience with those gaming applications. However, the optimization of the performance of those gaming applications by those computing devices may be complicated, as the proper configuration of system components (e.g., the use of particular video cards, Graphics Processing Units (GPUs), etc. in the computing device) and/or settings (e.g., processing system turbo mode settings, processing system overclocking settings, processing system hyperthreading settings, etc.) that result in the best gaming application performance can be relatively difficult to identify. Furthermore, system settings such as processing system turbo modes, processing system overclocking, processing system hyperthreading, and/or other advanced processing system settings that might be used to improve the performance of gaming application often operate to impact overall system performance as well. For example, an advanced processing system setting that provides for the overclocking the processing system at the highest available level might seem like an obvious choice to increase the performance of a gaming application, but may actually reduce that gaming application performance due to the effect that maximum overclocking level has on the overall system (e.g., because overclocking of the CPU utilizes power without enhancing graphics performance, and limits the power available to the GPU).

Accordingly, it would be desirable to provide a computing system application performance optimization system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a computing device/application performance optimization engine that is configured to: receive, from each of a first subset of a plurality of second computing devices, respective second computing device configuration information for that second computing device while that second computing device provided a first application, and respective second computing device performance information generated by that second computing device in response to that second computing device providing the first application; generate, using the second computing device configuration information for the first subset of the plurality of second computing devices while the first subset of the plurality of second computing devices provided the first application and the second computing device performance information generated by the first subset of the plurality of second computing devices in response to the first subset of the plurality of second computing devices providing the first application, a first computing device/application performance profile; determine that a first computing device is configured to provide the first application; generate, based on the first computing device/application performance profile and in response to determining that the first computing device is configured to provide the first application, a first computing device configuration communication that includes at least one first configuration change to a first computing device configuration for the first computing device; and transmit, to the first computing device, the first computing device configuration communication.

BRIEF DESCRIPTION OF THE DRAWINGS

FIG. 5 is a flow chart illustrating an embodiment of a method for optimizing performance of an application by a computing device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
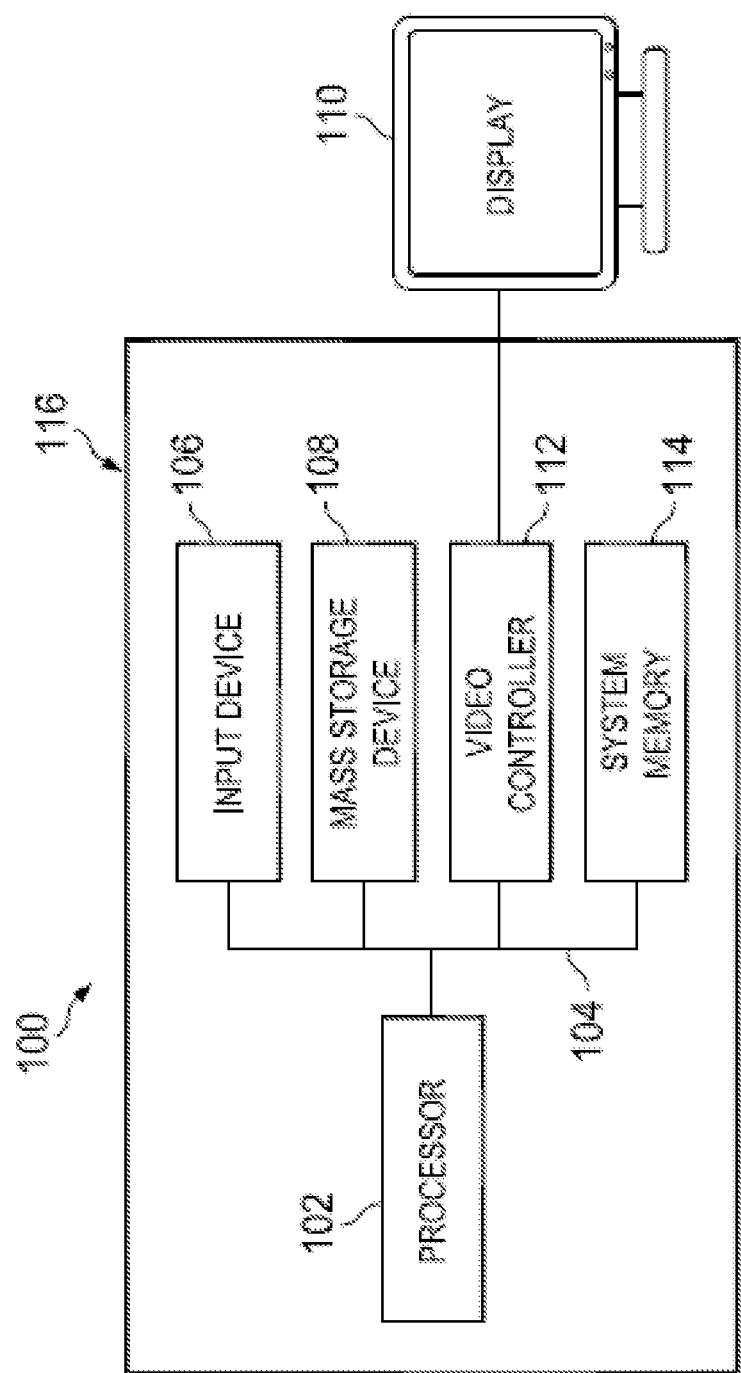
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
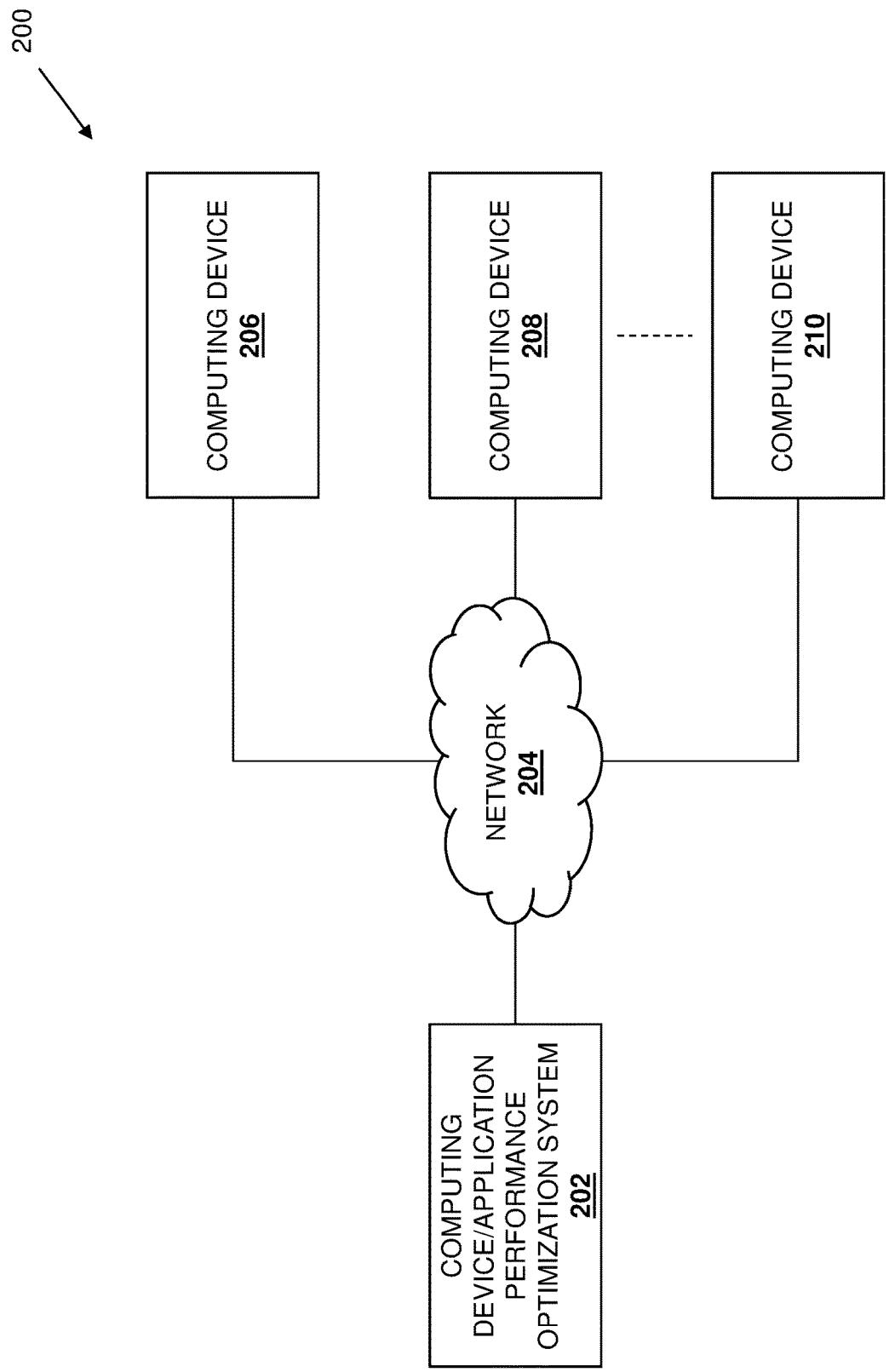
FIG. 2 is a schematic view illustrating an embodiment of a networked system that may utilize the computing device/application performance optimization system of the present disclosure.

Referring now to FIG. 2, an embodiment of a networked system 200 is illustrated that may utilize the computing device/application performance optimization system of the present disclosure. In the illustrated embodiment, the networked system 200 includes a computing device/application performance optimization system 202. In an embodiment, the computing device/application performance optimization system 202 'may be provided by the IHS 100 discussed above with reference to FIG. 1, and/or may include some or all of the components of the IHS 100, and in specific examples may be provided by one or more server devices. However, while illustrated and discussed as being provided by one or more server devices, one of skill in the art in possession of the present disclosure will recognize that computing device/application performance optimization system 202 provided in the networked system 200 may include any devices that may be configured to operate similarly as the computing device/application performance optimization system 202 discussed below.

In the illustrated embodiment, the networked system 200 includes a network 204 that may be provided by a Local Area Network (LAN), the Internet, combinations thereof, and/or any of a variety of other networks that would be apparent to one of skill in the art in possession of the present disclosure. As illustrated, the computing device/application performance optimization system 202 may be coupled via the network 204 to a plurality of computing devices 206, 208, and up to 210. In an embodiment, any or all of the computing devices 206-210 may be provided by the IHS 100 discussed above with reference to FIG. 1, and/or may include some or all of the components of the IHS 100, and in the specific examples discussed below are provided by respective desktop computing devices or laptop/notebook computing device that operate to provide gaming applications. However, while illustrated and described as gaming desktop or laptop/notebook computing devices, one of skill in the art in possession of the present disclosure will appreciate how the computing devices 206-210 may be provided by a variety of other computing devices and may provide a variety of other applications and/or perform other workloads while remaining within the scope of the present disclosure as well.

In the embodiments illustrated and discussed below, the computing devices 206-210 include a first computing device (e.g., the computing device 206 in the examples below) that has its computing devices configuration configured to optimize its performance of an application based on a computing device/application performance optimization profile, with that computing device/application performance optimization profile generate based on computing device configuration information and computing device performance information reported by second computing devices (e.g., the computing devices 208 and up to 210) that provide that application. However, while a specific networked system 200 is illustrated and described, one of skill in the art in possession of the present disclosure will recognize that networked systems including the computing device/application performance optimization system of the present disclosure may include a variety of components and component configurations while remaining within the scope of the present disclosure as well.

Figure 3:
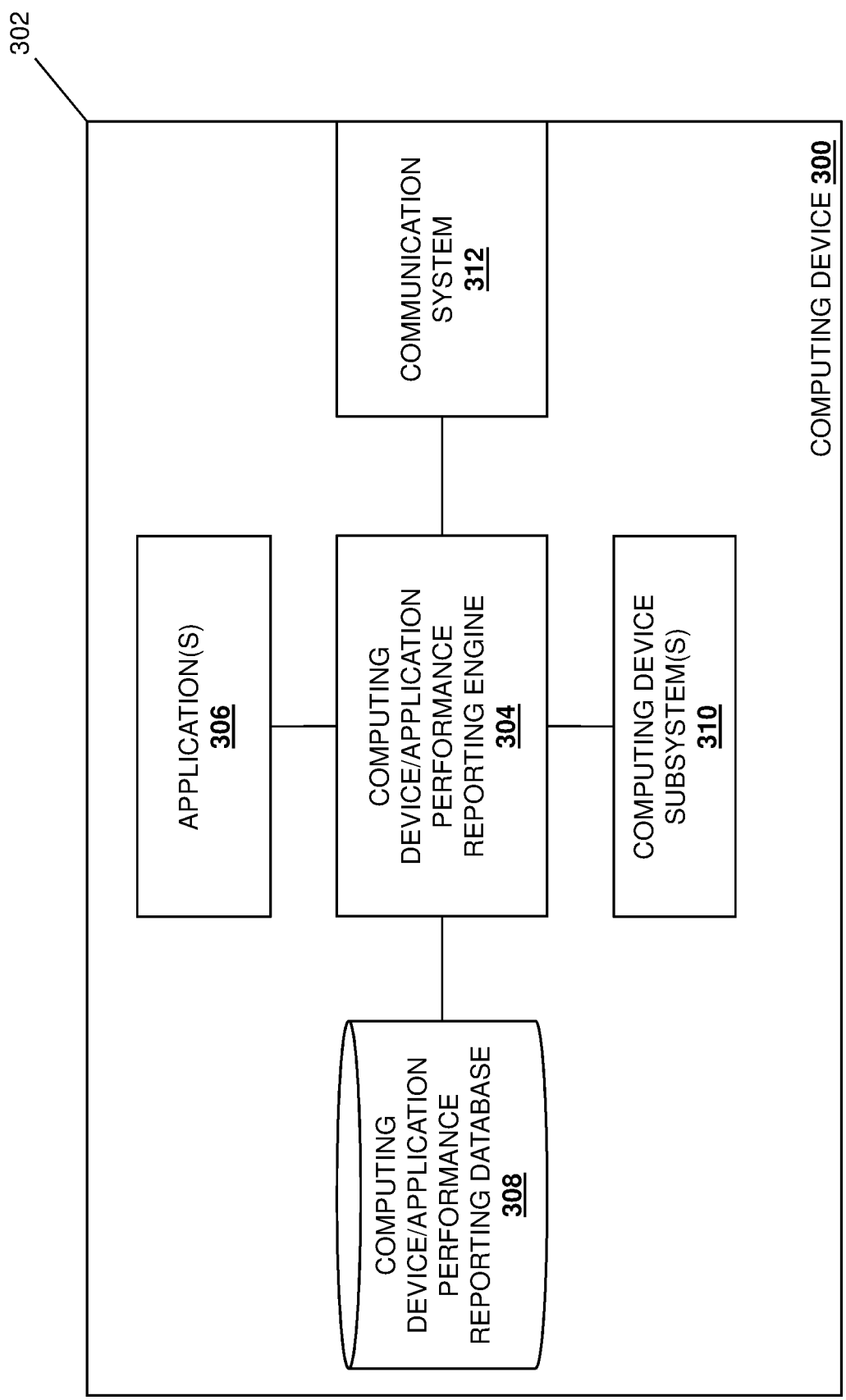
FIG. 3 is a schematic view illustrating an embodiment of a computing device that may be included in the networked system of FIG. 2.

Referring now to FIG. 3, an embodiment of a computing device 300 is illustrated that may provide any or all of the computing devices 206-210 discussed above with reference to FIG. 2. As such, the computing device 300 may be provided by the IHS 100 discussed above with reference to FIG. 1 and/or may include some or all of the components of the IHS 100, and in specific examples below is described as being provided by desktop or laptop/notebook computing devices. However, while illustrated and discussed as being provided by desktop or laptop/notebook computing devices, one of skill in the art in possession of the present disclosure will recognize that the functionality of the computing device 300 discussed below may be provided by other devices that are configured to operate similarly as the computing device 300 discussed below to provide any of a variety of other applications or perform other workloads that would be apparent to one of skill in the art in possession of the present disclosure. In the illustrated embodiment, the computing device 300 includes a chassis 302 that houses the components of the computing device 300, only some of which are illustrated and discussed below.

For example, the chassis 302 may house a processing system (not illustrated, but which may include one or more of the processor 102 discussed above with reference to FIG. 1). For example, in embodiments in which the computing device 300 is provided by a desktop or laptop/notebook computing device that provides gaming application(s), the processing system may include a central processing subsystem having one or more Central Processing Units (CPUs), and a graphics processing subsystem having one or more Graphics Processing Units (GPUs). However, while a specific gaming processing system configuration is described herein, one of skill in the art in possession of the present disclosure will appreciate how any of a variety of different processing systems having any of a variety of processing system configurations will benefit from the teachings of the present disclosure and thus are envisioned as falling within its scope.

In an embodiment, the chassis 302 may also house a memory system (not illustrated, but which may include the memory 114 discussed above with reference to FIG. 1) that is coupled to the processing system and that includes instructions that, when executed by the processing system (e.g., by the central processing subsystem discussed above), cause the processing system to provide a computing device/application performance reporting engine 304 that is configured to perform the functionality of the computing device/application performance reporting engines and/or computing devices discussed below. Furthermore, the memory system housed in the chassis 302 may also include instructions that, when executed by the processing system (e.g., by the graphics processing subsystem and the central processing subsystem discussed above), cause the processing system to provide one or more applications 306 such that the gaming applications and/or other applications discussed below. Furthermore, while described as gaming applications or other applications, one of skill in the art in possession of the present disclosure will appreciate how the application(s) 306 may be replaced by a variety of other workloads that would be apparent to one of skill in the art in possession of the present disclosure.

The chassis 302 may also house a storage system (not illustrated, but which may include the storage 108 discussed above with reference to FIG. 1) that is coupled to the computing device/application performance reporting engine 304 (e.g., via a coupling between the storage system and the processing system) and that includes a computing device/application performance reporting database 308 that is configured to store any of the information utilized by the computing device/application performance reporting engine 304 discussed below. The chassis 302 may also house a communication system 312 that is coupled to the computing device/application performance reporting engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
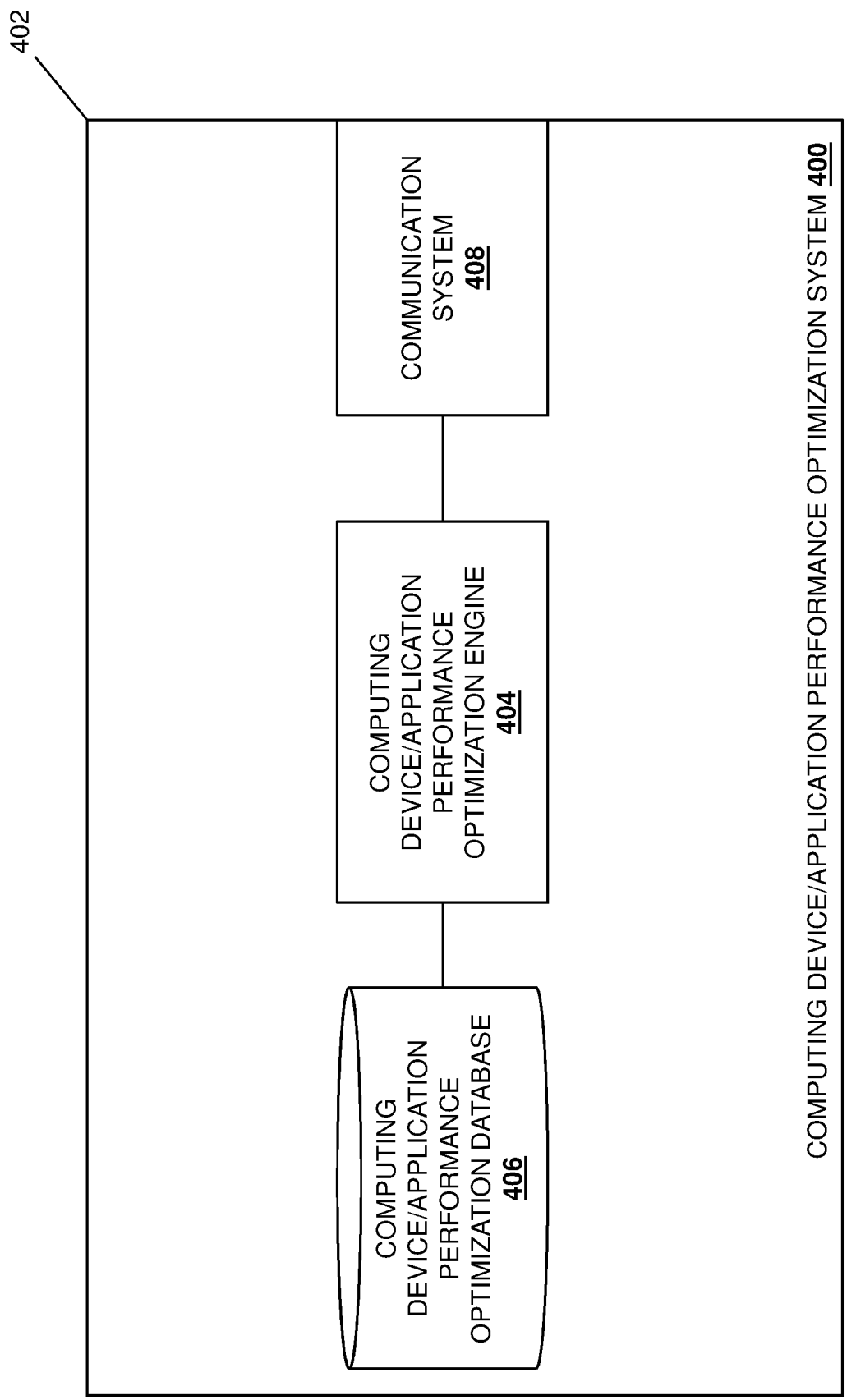
FIG. 4 is a schematic view illustrating an embodiment of a computing device/application performance optimization system that may be included in the networked system of FIG. 2.

Referring now to FIG. 4, an embodiment of a computing device/application performance optimization system 400 is illustrated that may provide the computing device/application performance optimization system 200 discussed above with reference to FIG. 2. As such, the computing device/application performance optimization system 400 may be provided by the IHS 100 discussed above with reference to FIG. 1 and/or may include some or all of the components of the IHS 100, and in specific examples may be provided by one or more server devices. However, while illustrated and discussed as being provided by one or more server devices, one of skill in the art in possession of the present disclosure will recognize that the functionality of the computing device/application performance optimization system 400 discussed below may be provided by other devices that are configured to operate similarly as the computing device/application performance optimization system 400 discussed below. In the illustrated embodiment, the computing device/application performance optimization system 400 includes a chassis 402 that houses the components of the computing device/application performance optimization system 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a computing device/application performance optimization engine 404 that is configured to perform the functionality of the computing device/application performance optimization engines and/or computing device/application performance optimization systems discussed below.

The chassis 402 may also house a storage system (not illustrated, but which may include the storage 108 discussed above with reference to FIG. 1) that is coupled to the computing device/application performance optimization engine 404 (e.g., via a coupling between the storage system and the processing system) and that includes a computing device/application performance optimization database 406 that is configured to store any of the information utilized by the computing device/application performance optimization engine 404 discussed below. The chassis 402 may also house a communication system 408 that is coupled to the computing device/application performance optimization engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. However, while a specific computing device/application performance optimization system 400 has been illustrated and described, one of skill in the art in possession of the present disclosure will recognize that computing device/application performance optimization systems (or other devices operating according to the teachings of the present disclosure in a manner similar to that described below for the computing device/application performance optimization system 400) may include a variety of components and/or component configurations for providing conventional server device functionality, as well as the functionality discussed below, while remaining within the scope of the present disclosure as well.

Referring now to FIG. 5, an embodiment of a method 500 for optimizing performance of an application by a computing device is illustrated. As discussed below, the systems and methods of the present disclosure provide for the analysis of the provisioning of an application by a plurality of different second computing devices having different second computing device configurations in order to generate a computing device/application performance profile that identifies the computing device configuration(s) that provide for the best performance of that application, which allows first computing device(s) that are identified as being configured to provide that application (e.g., that have installed that application) to have their first computing device configuration analyzed in consideration of the computing device/application performance profile in order to determine one or more computing device configuration changes for those first computing device(s) that will optimize the performance of that application by those first computing device(s).

For example, the networked system of the present disclosure may include a first computing device, second computing devices, and a computing device/application performance optimization system that are all coupled to a network. The computing device/application performance optimization system receives second computing device configuration information for each second computing device while they provided a first application, and second computing device performance information generated by each second computing device in response to providing the first application, and uses them to generate a first computing device/application performance profile. When the computing device/application performance optimization system determines that the first computing device is configured to provide the first application, it generates a first computing device configuration communication that includes at least one first configuration change to a first computing device configuration for the first computing device based on the first computing device/application performance profile, and transmits the first computing device configuration communication to the first computing device.

The method 500 begins at block 502 where a computing device/application performance optimization system receives second computing device configuration information and second computing device performance information from second computing devices providing an application, and stores them in a database. In an embodiment, at block 502 and with reference to FIGS. 6A and 6B, the computing devices 208/300 and up to 210/300 in the networked system 200 may operate to provide an application 306 that, in the examples below, is a particular gaming application, but as discussed above may be any of a variety of applications and/or workloads that would be apparent to one of skill in the art in possession of the present disclosure. As will be appreciated by one of skill in the art in possession of the present disclosure, the method 500 may be performed for any particular application or workload (e.g., the particular gaming application discussed above), and thus different performances of the method 500 may provide for computing device/application performance optimization for respective different applications.

Figure 6A:
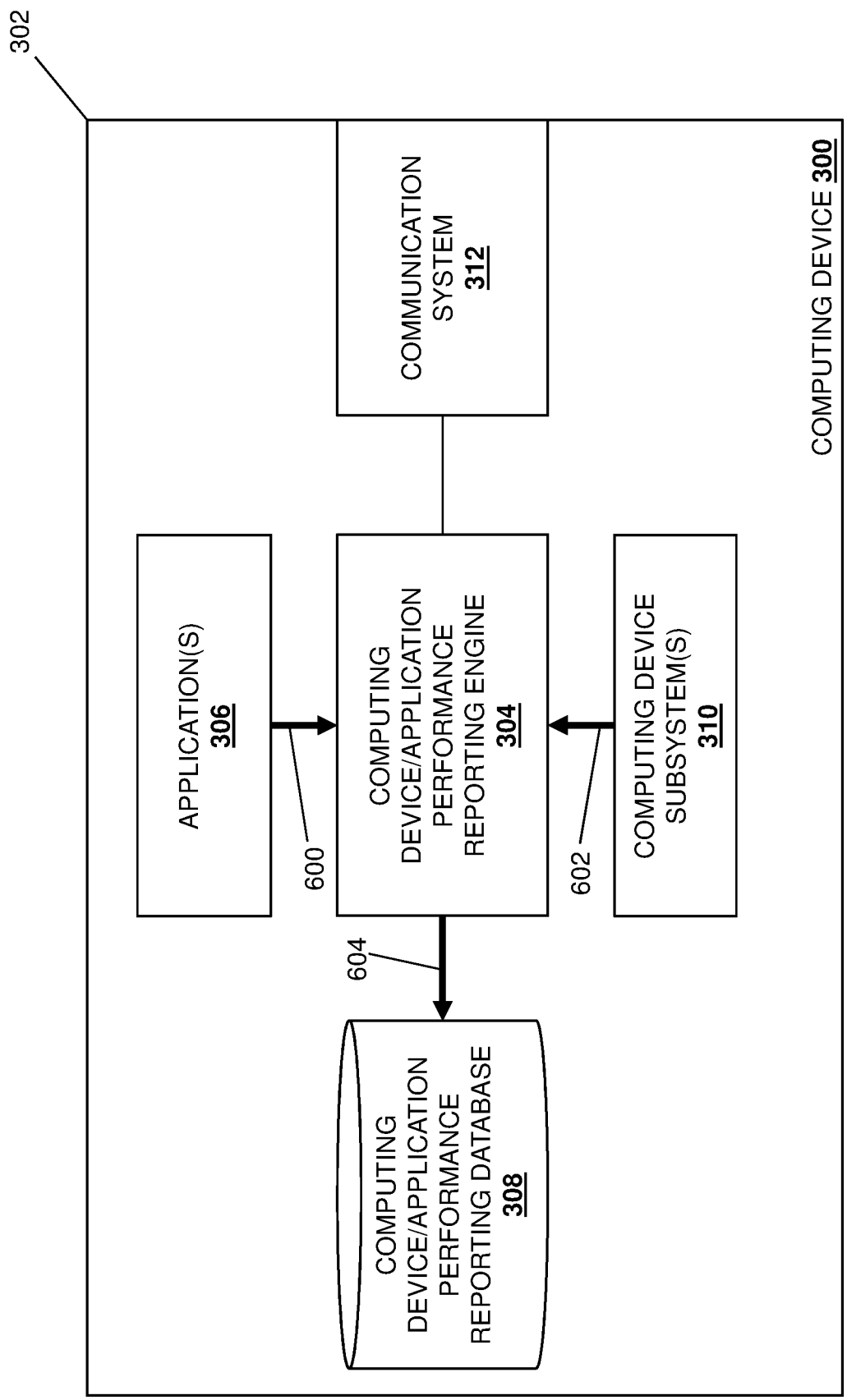
FIG. 6A is a schematic view illustrating an embodiment of the computing device of FIG. 3 operating during the method of FIG. 5.
Figure 6B:
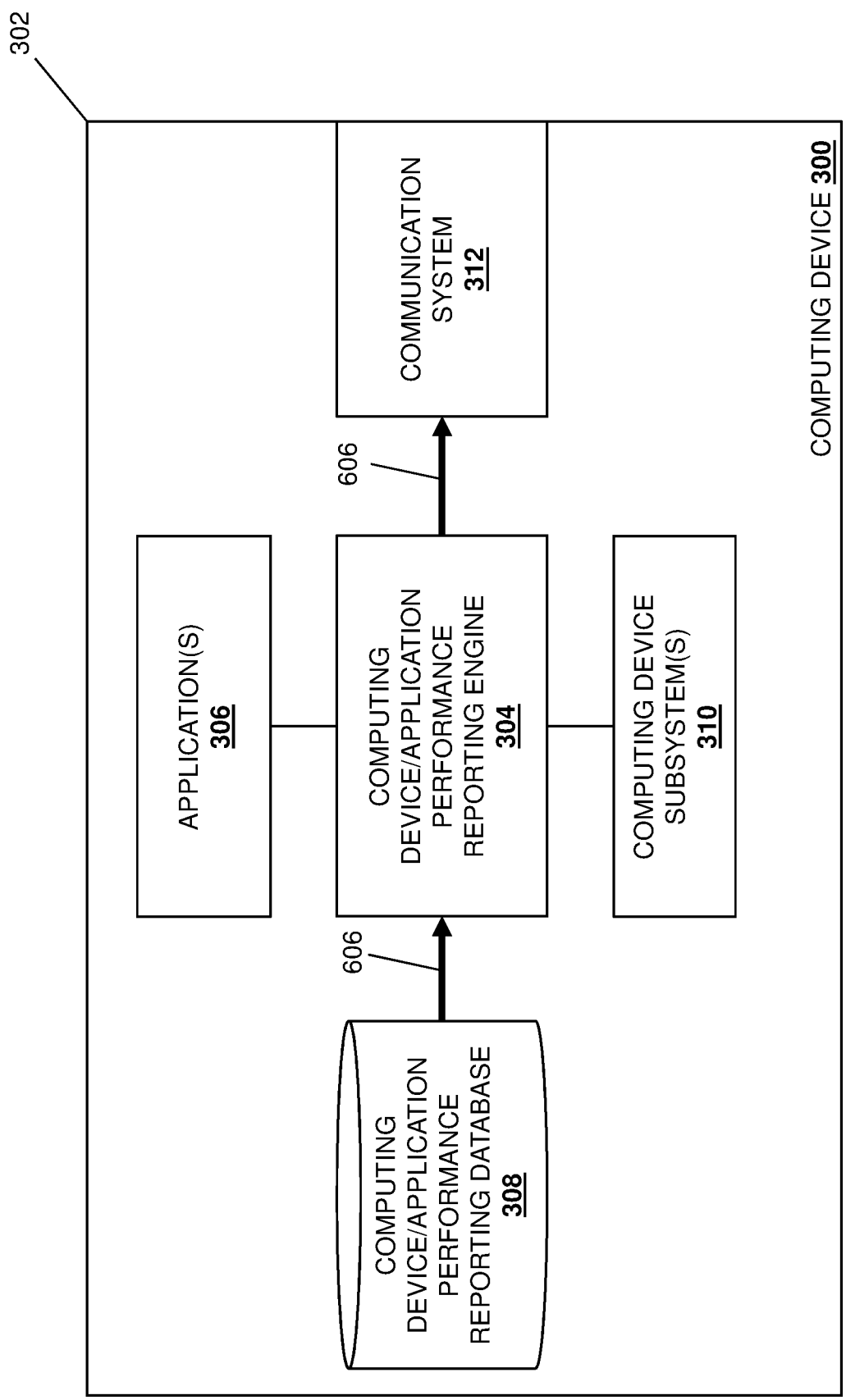
FIG. 6B is a schematic view illustrating an embodiment of the computing device of FIG. 3 operating during the method of FIG. 5.

In response to the computing devices 208/300 and up to 210/300 in the networked system 200 operating to provide the application 306, the computing device/application performance reporting engine 304 in each of the computing devices 208/300 and up to 210/300 may perform performance monitoring operations 600 to retrieve computing device performance information associated with the performance of the application 306 (which is illustrated as being retrieved from the application 306 in FIG. 6A, but which one of skill in the art in possession of the present disclosure will recognize may also be retrieved from any component in the computing device 300 that is utilized to provide (or is otherwise associated with the provisioning of) the application 306).

In a specific example that one of skill in the art in possession of the present disclosure will recognize is related to the provisioning of gaming applications, the computing device performance information may be provided by telemetry information that may include power consumption information, Frames-Per-Second (FPS) information, temperature of the processor/board junction ($T_j$) information, Graphics Processing Unit (GPU) temperature information, other temperature information, fan speed information, fan acoustical level information, in-game performance information, and/or any other computing device performance information that would be apparent to one of skill in the art in possession of the present disclosure.

Furthermore, the computing device/application performance reporting engine 304 in each of the computing devices 208/300 and up to 210/300 may perform computing device configuration information retrieval operations 602 that include retrieving computing device configuration information for that computing device from the computing device subsystem(s) 310. In a specific example that one of skill in the art in possession of the present disclosure will recognize is related to the provisioning of gaming applications, the computing device configuration information may include a computing device operating mode setting (e.g., "gaming" mode, "productivity" mode, "Digital Content Creation (DCC)" mode, etc.), computing device component identifiers identifying computing device components in that computing device, and/or any of a variety of computing device configuration information that would be apparent to one of skill in the art in possession of the present disclosure.

For example, the inventors of the present application describe particular computing device processing subsystem settings that may be provided according to respective computing device operating modes in U.S. patent application Ser. No. 14/243,702, attorney docket no. 16356.2263US01, filed on Apr. 29, 2021, the disclosure of which is incorporated herein by reference in its entirety, and at block 502 any settings defined for those computing device operating modes may be retrieved while remaining within the scope of the present disclosure as well. However, while specific computing device configuration information is described above, one of skill in the art in possession of the present disclosure will appreciate that any of a variety of computing device configuration information may be retrieved while remaining within the scope of the present disclosure.

Figure 6C:
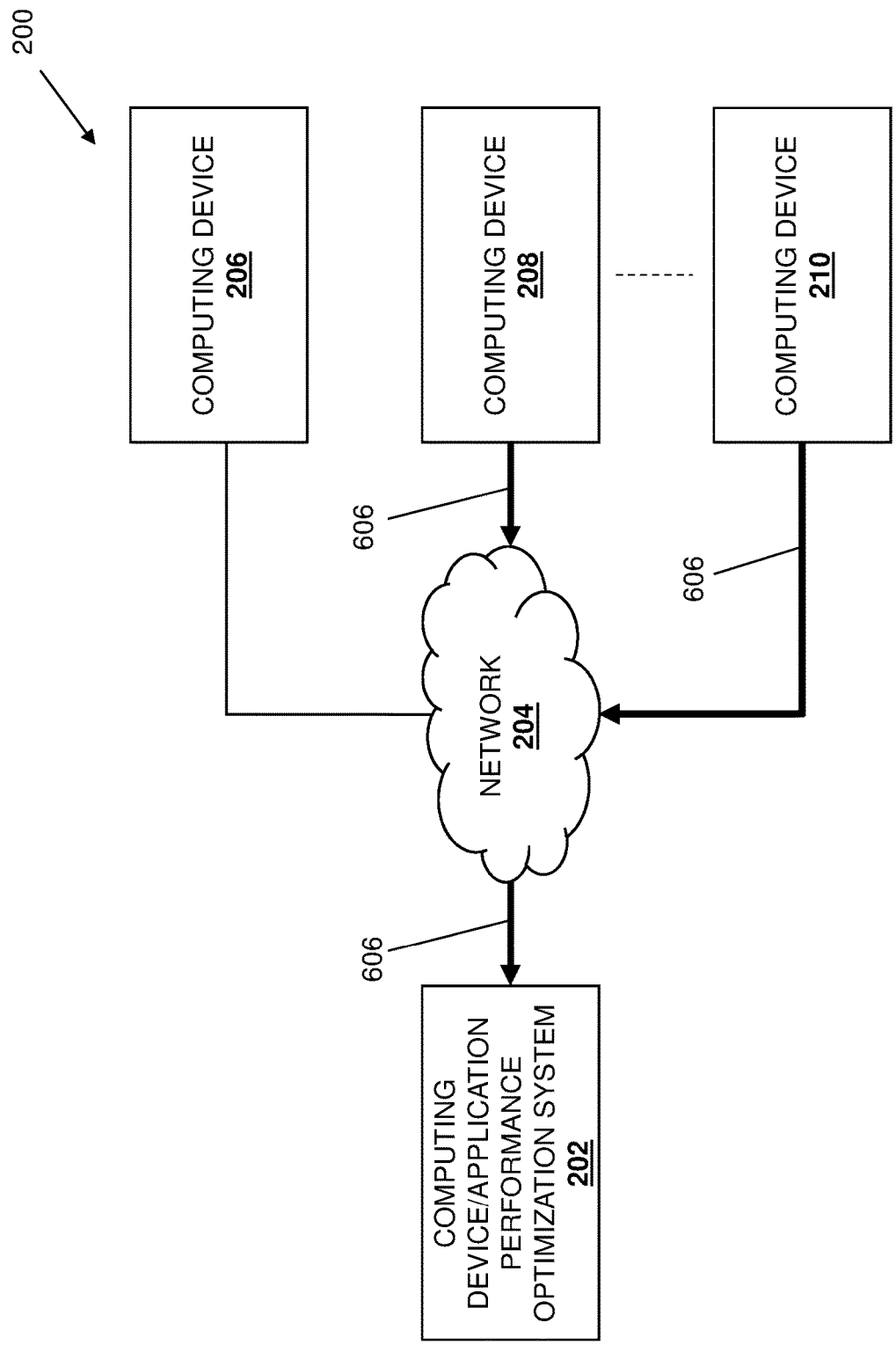
FIG. 6C is a schematic view illustrating an embodiment of the networked system of FIG. 2 operating during the method of FIG. 5.

With reference to FIG. 6A, the computing device/application performance reporting engine 304 in each of the computing devices 208/300 and up to 210/300 may then perform storage operations 604 to store the computing device performance information and the computing device configuration information in its computing device/application performance reporting database 308. Furthermore, with reference to FIGS. 6B and 6C the computing device/application performance reporting engine 304 in each of the computing devices 208/300 and up to 210/300 may then perform transmission operations 606 that include retrieving the computing device performance information and the computing device configuration information from its computing device/application performance reporting database 308 and transmitting that computing device performance information and the computing device configuration information via its communication system 312, through the network 204, and to the computing device/application performance optimization system 202. In some embodiments, the transmission operations 606 may be preceded by the formatting of the computing device performance information and the computing device configuration information to facilitate, for example, data comparison and/or other data operations that would be apparent to one of skill in the art in possession of the present disclosure.

In some examples, the storage operations 604 by the computing device/application performance reporting engine 304 in each of the computing devices 208/300 and up to 210/300 may be performed for some predefined time period (e.g., daily), while the transmission operations 606 by the computing device/application performance reporting engine 304 in each of the computing devices 208/300 and up to 210/300 may be performed following that predefined time period to "upload" or otherwise transmit computing device performance information generated in response to the performance of the application and the computing device configuration information utilized while performing the application to the computing device/application performance optimization system 202. For example, the daily collection and storage of the computing device performance information and the computing device configuration information as discussed above may provide context about the usage of the application by the computing device that generates it (e.g., by providing a percentage of time the application was used, power consumed using the application, key platform change information that describes how often the computing device changes states (e.g., platform "C" states, hibernation states, sleep states, power limits, clock speeds, etc.), and/or any other contextual usage information that would be apparent to one of skill in the art in possession of the present disclosure).

However, while particular timings for the retrieval, storage, and transmittal of computing device performance information generated in response to the performance of the application and computing device configuration information utilized while performing the application have been described, one of skill in the art in possession of the present disclosure will appreciate how that computing device performance information and computing device configuration information may be transmitted using other timings (e.g., real-time transmission) while remaining within the scope of the present disclosure as well.

Figure 6D:
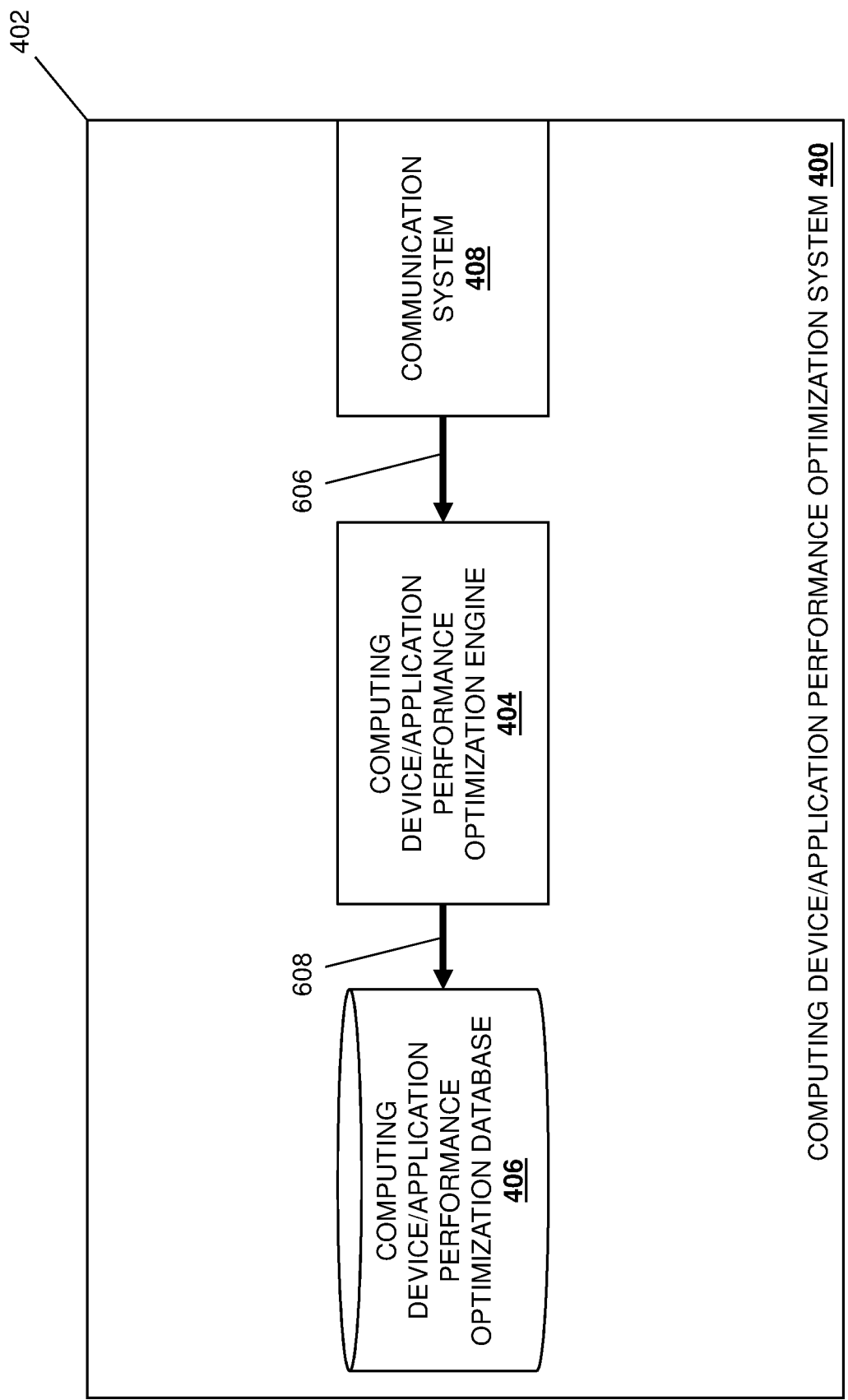
FIG. 6D is a schematic view illustrating an embodiment of the computing device/application performance optimization system of FIG. 4 operating during the method of FIG. 5.

With reference to FIGS. 6D and 6E, at block 502 and as part of the transmission operations 606 performed by the computing device/application performance reporting engine 304 in each of the computing devices 208/300 and up to 210/300, the computing device/application performance optimization engine 404 in the computing device/application performance optimization system 202/400 may receive the computing device performance information and computing device configuration information through the network 204 via its communication system 408, and may then perform storage operations 608 to store that computing device performance information and computing device configuration information in its computing device/application performance optimization database 406.

As such, for different performances of the method 500, the computing device/application performance optimization system 202/400 may store computing device performance information generated in response to the performance of different applications by subsets of the computing devices 208 and up to 210, as well as the computing device configuration information utilized while performing those different applications by those subsets of the computing devices 208 and up to 210. Furthermore, one of skill in the art in possession of the present disclosure will recognize how the computing device performance information generated in response to the performance of any particular application and the computing device configuration information utilized while performing that application may be stored in association with that application in the computing device/application performance optimization database 406, resulting in the computing device/application performance optimization database 406 storing, for any particular application, computing device performance information generated by a plurality of the computing devices 208 and up to 210 in response to the performance of that application, and the computing device configuration information for that plurality of the computing devices 208 and up to 210 while performing that application.

In some embodiments, the computing device/application performance optimization system 202/400 may the aggregate, organize, and/or compile the computing device performance information and the computing device configuration information into groups for the purposes of performing the analysis discussed below. For example, for computing device performance information and computing device configuration information associated with a gaming application, that information may be aggregated, organized, and/or compiled to provide an information group associated with gaming application boot operations, an information group associated with gaming application play operations, an information group associated with combined application operations (e.g., the use of multiple applications (e.g., a gaming application and a streaming application) in parallel), and/or any other information groups that would be apparent to one of skill in the art in possession of the present disclosure.

Figure 7:
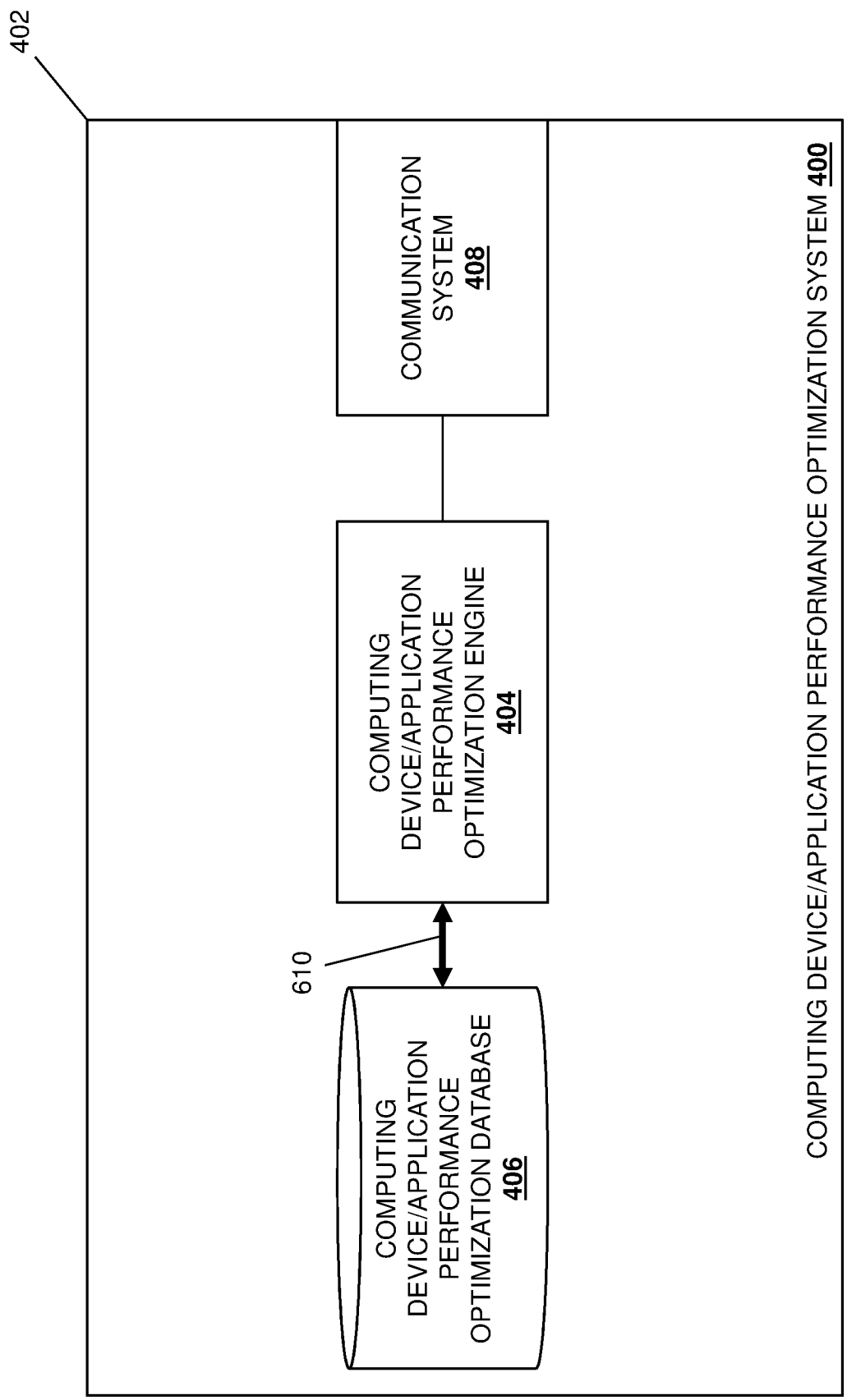
FIG. 7 is a schematic view illustrating an embodiment of the computing device/application performance optimization system of FIG. 4 operating during the method of FIG. 5.

The method 500 then proceeds to block 504 where the computing device/application performance optimization system generates a computing device/application performance profile for the application. With reference to FIG. 7, in an embodiment of block 504, the computing device/application performance optimization engine 404 in the computing device/application performance optimization system 202/400 may perform computing device/application performance profile generation operations 610 that may include accessing the computing device performance information and computing device configuration information stored in its computing device/application performance optimization database 406 in association with a particular application, analyzing that computing device performance information and computing device configuration information and, in response to that analysis, generating computing device/application performance profile(s) for that application that identify computing device configuration(s) that provide for optimized and/or relatively high performance of that application, and storing those computing device/application performance profile(s) in its computing device/application performance optimization database 406.

In some specific examples, the computing device/application performance optimization engine 404 in the computing device/application performance optimization system 202/400 may include an artificial intelligence engine and/or a machine-learning engine that is configured to analyze the computing device performance information and computing device configuration information for an application to generate the computing device/application performance profile(s) for that application. As such, the computing device/application performance optimization engine 404 in the computing device/application performance optimization system 202/400 may perform one or more artificial intelligence operations and/or machine-learning operations (e.g., unsupervised machine-learning operations, random forest machine-learning operations, etc.) in order to analyze the computing device performance information and computing device configuration information for an application and generate the computing device/application performance profile(s) for that application. In some examples, the analysis of the computing device performance information and computing device configuration information for an application may be performed for computing device performance information and computing device configuration information associated with different computing device operating modes (discussed above), which result in the generation of a respective computing device/application performance profile for each computing device operating mode that has been utilized to provide the application.

As such, following block 504, computing device/application performance profile(s) may have been generated for any application and may identify computing device configurations (e.g., components, settings, and/or other computing device features) that have provided for the best performance of that application. As will be appreciated by one of skill in the art in possession of the present disclosure, the "best performance" of an application may be defined by combinations of performance metrics and/or via any other performance characterization techniques known in the art, and may differ based on different operating modes available to computing devices (e.g., the "best performance" of an application in a "high performance" mode may be defined differently than the "best" performance of that application in a "quiet" mode). Furthermore, the computing device/application performance profile(s) generated for an application may differ across computing device platforms as well. For example, for any particular application, a high-performance gaming laptop/notebook computing platform may have a first computing device/application performance profile that differs from a second computing device/application performance profile provided for a lower-end/less expensive laptop/notebook computing platform. As such, one of skill in the art in possession of the present disclosure will appreciate how the computing device/application performance profiles generated at block 504 for a particular computing device platform may be generated using computing device performance information and computing device configuration information received from computing devices that belong to that computing device platform.

The method 500 then proceeds to decision block 506 where it is determined whether first computing device(s) have been identified that are configured to provide the application. In an embodiment, at decision block 506, the computing device/application performance optimization engine 404 in the computing device/application performance optimization system 202/400 may operate to determine whether a computing device is configured to provide an application for which a computing device/application performance profile has been generated. For example, the determination of whether a computing device is configured to provide an application may be performed by determining whether the application has been installed on that computing device, whether that application has been launched, "started up", or otherwise initialized on that computing device, whether that application is currently being provided on that computing device, whether that application has recently ceased being provided on that computing device (e.g., following the "closing", stopping, or other operation that ceases a current provisioning of the application), and/or any of application configuration indicators that one of skill in the art in possession of the present disclosure will appreciate are indicative of the future provisioning of the application on that computing device.

If, at decision block 506, it is determined that first computing device(s) have not been identified that are configured to provide the application, the method 500 returns to block 502. As such, the method 500 may loop such that the computing device/application performance optimization system 202/400 receives computing device configuration information and computing device performance information from computing devices performing applications, stores that computing device configuration information and computing device performance information in its database, and generates or supplements computing device/application performance profiles for those computing device applications as long as a computing device is not identified that is configured to provide that application at decision block 506. Thus, one of skill in the art in possession of the present disclosure will appreciate how the method 500 may generate computing device/application performance profiles for any number of different applications while remaining within the scope of the present disclosure.

Figure 8A:
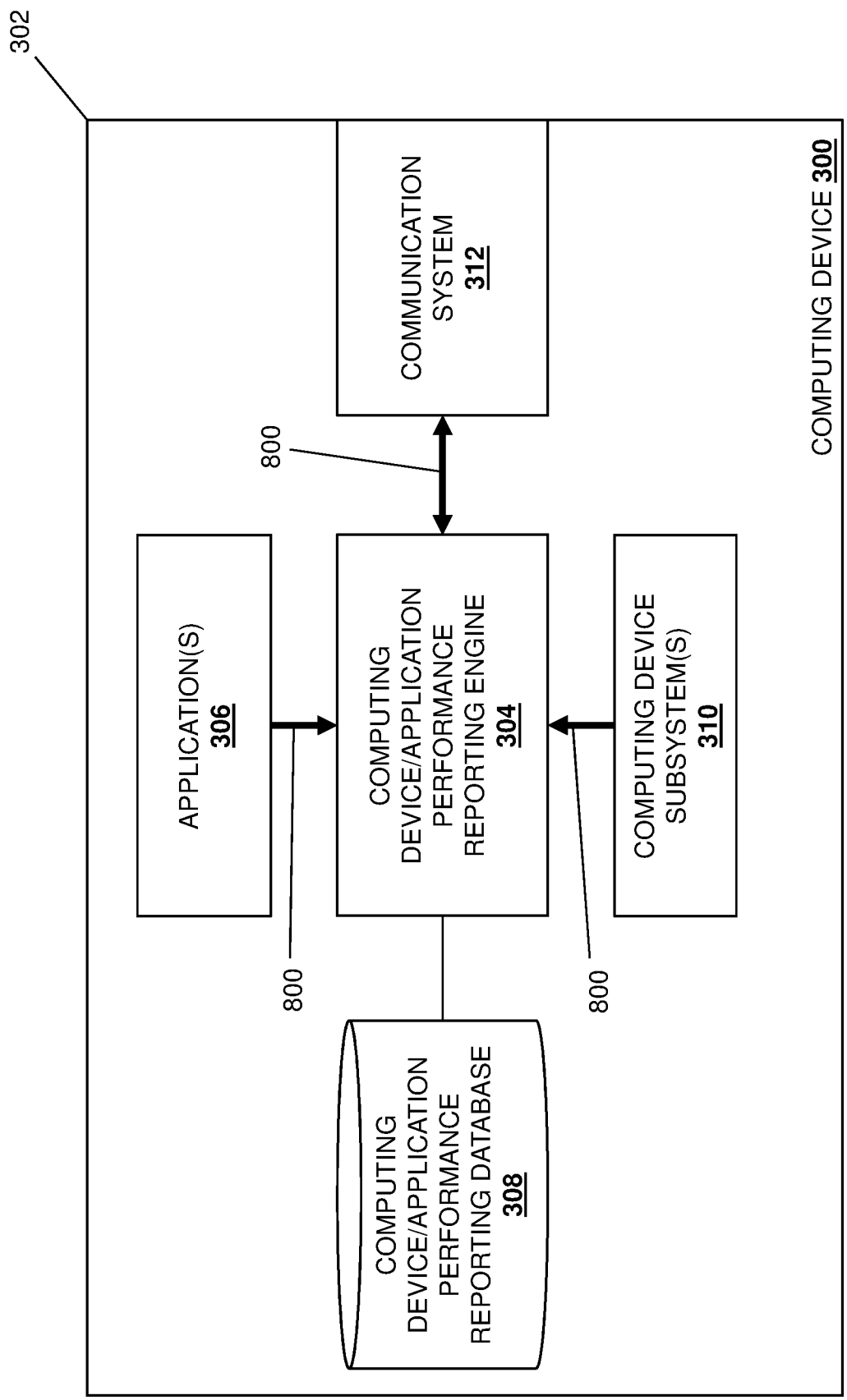
FIG. 8A is a schematic view illustrating an embodiment of the computing device of FIG. 3 operating during the method of FIG. 5.
Figure 8B:
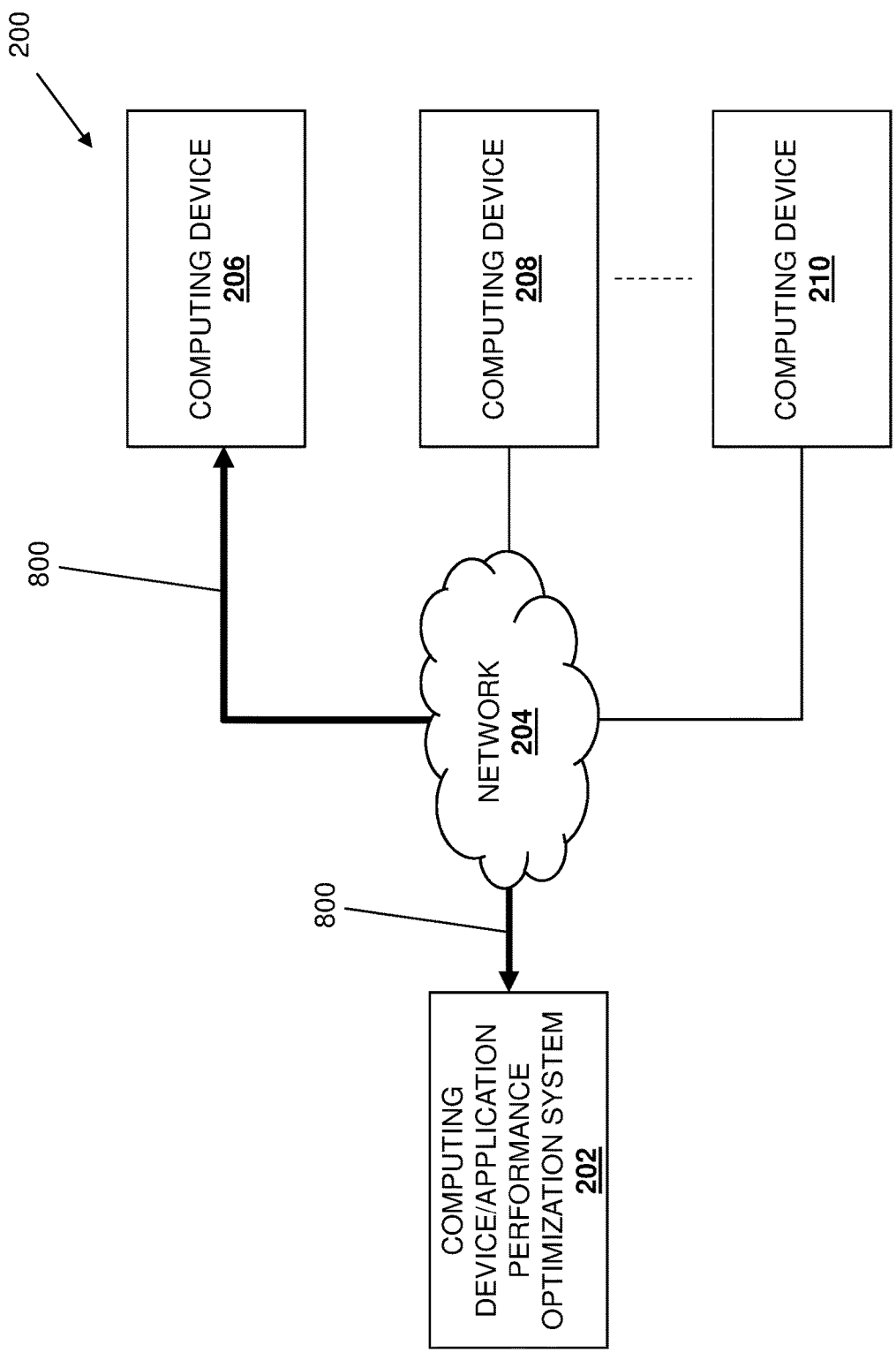
FIG. 8B is a schematic view illustrating an embodiment of the networked system of FIG. 2 operating during the method of FIG. 5.
Figure 8C:
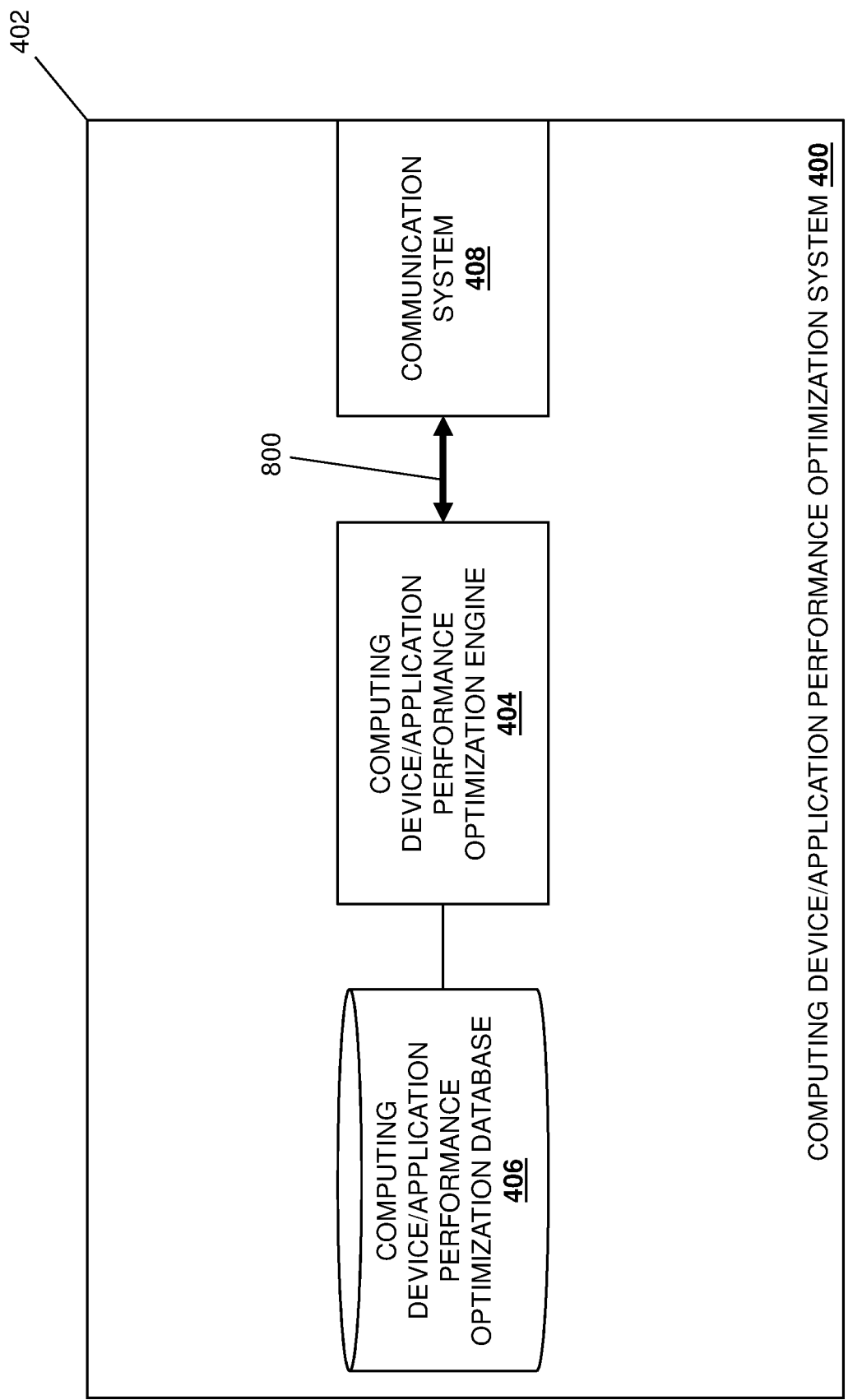
FIG. 8C is a schematic view illustrating an embodiment of the computing device/application performance optimization system of FIG. 4 operating during the method of FIG. 5.

If, at decision block 506, it is determined that first computing device(s) have been identified that are configured to provide the application, the method 500 proceeds to block 508 where the computing device/application performance optimization system generates first computing device configuration communication(s) based on the computing device/application performance profile. With reference to FIGS. 8A, 8B, and 8C, in an embodiment of decision block 508, the computing device/application performance reporting engine 304 in the computing device 206/300 may perform application configuration communication operations 800 that include identifying an application 306 that the computing device 300 has been configured to provide, as well as retrieving a computing device configuration of the computing device 206/300 from the computing device subsystem(s) 310.

Furthermore, the application configuration communication operations 800 may include the computing device/application performance reporting engine 304 in the computing device 206/300 and the computing device/application performance optimization engine 404 in the computing device/application performance optimization system 202/400 communicating via their respective communication system 312 and 408 and via the network 204, which may allow the computing device/application performance optimization engine 404 in the computing device/application performance optimization system 202/400 to identify the computing device configuration of the computing device 206/300, as well as that the computing device 206/300 is configured to provide the application 306 based on, for example, that application 306 having been installed on that computing device 206/300, that application 306 having been launched, "started up", or otherwise initialized on that computing device 206/300, that application 306 currently being provided on that computing device 206/300, that application 306 having recently ceased being provided on that computing device 206/300 (e.g., following the "closing", stopping, or other operation that ceases a current provisioning of that application), and/or any of application configuration indicators that one of skill in the art in possession of the present disclosure will appreciate are indicative of the future provisioning of the application 306 on that computing device 206/300.

Figure 8D:
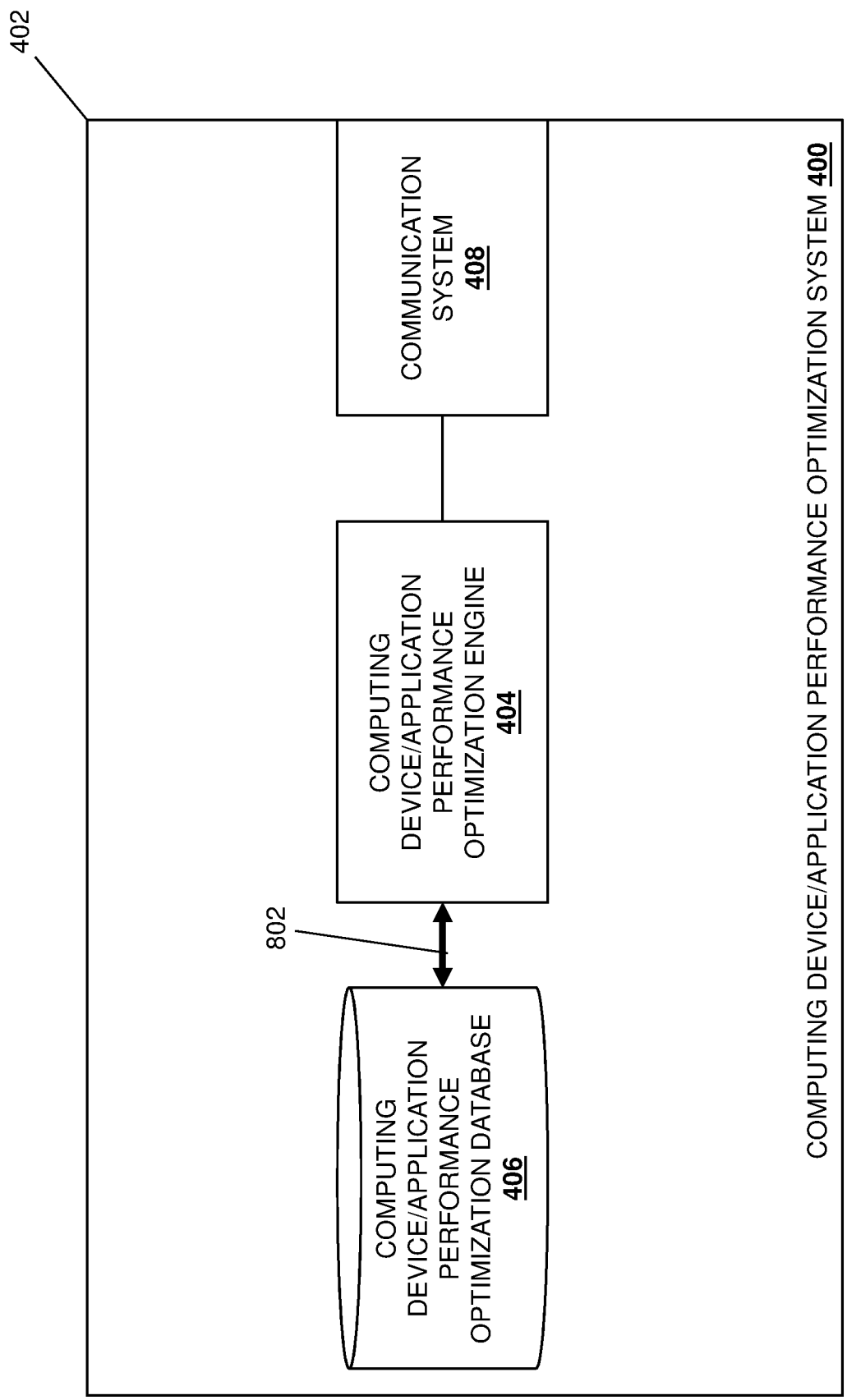
FIG. 8D is a schematic view illustrating an embodiment of the computing device/application performance optimization system of FIG. 4 operating during the method of FIG. 5.

As illustrated in FIG. 8D, at block 510 and following the identification of the computing device 206/300 as having been configured to perform the application 306, the computing device/application performance optimization engine 404 in the computing device/application performance optimization system 202/400 may perform computing device configuration communication generation operations 802 that may include identifying the application 306 that the computing device 306 was identified as being configured to perform at decision block 506, determining the computing device/application performance profile(s) that are associated with that application 306 in the computing device/application performance optimization database 406, generating one or more configuration changes to the computing device configuration for the computing device 206/300 based on the computing device/application performance profile(s), and providing those configuration change(s) in a computing device configuration communication.

For example, the configuration changes to the computing device configuration for the computing device 206/300 may be generated by comparing the computing device configuration for the computing device 206/300 to the computing device configuration information defined by the computing device/application performance profile for the application 306, identifying each component and/or setting of the computing device configuration for the computing device 206/300 that must be changed to correspond the computing device configuration information defined by the computing device/application performance profile for the application 306, and providing those component changes and/or settings changes as the configuration change(s) in the computing device configuration communication. As discussed above, computing device/application performance profiles for an application may differ based on a computing device operating mode, and thus in some examples the computing device/application performance profile utilized at block 508 may be selected based on the current computing device operating mode of the computing device 206/300 (e.g., as identified via its computing device configuration reported via the application configuration communication operations 800).

As discussed in further detail below, the configuration change(s) generated at block 508 and provided in the computing device configuration communication may include recommended component changes such as, for example, recommendations to change a processing subsystem (e.g., a GPU and/or CPU), recommendations to change a video card, recommendations to change memory device(s), recommendations to add memory device(s), recommendations to change storage device(s), recommendations to add storage device(s), recommendations to change a networking device, recommendations to update drivers, and/or any other component changes that one of skill in the art in possession of the present disclosure will recognize may configure a computing device to provide an application at a relatively higher performance level. As also discussed in further detail below, the configuration change(s) generated at block 508 and provided in the computing device configuration communication may include recommended settings changes such as, for example, recommendations to change processing subsystem settings (e.g., a GPU and/or CPU setting), recommendations to change a video card setting, recommendations to change a memory device setting, recommendations to change a storage device setting, recommendations to change a networking device setting, recommendations to change an operating system setting, recommendations to change settings for the application 306, and/or any other settings changes that one of skill in the art in possession of the present disclosure will recognize may configure a computing device to provide an application at a relatively higher performance level.

Figure 8E:
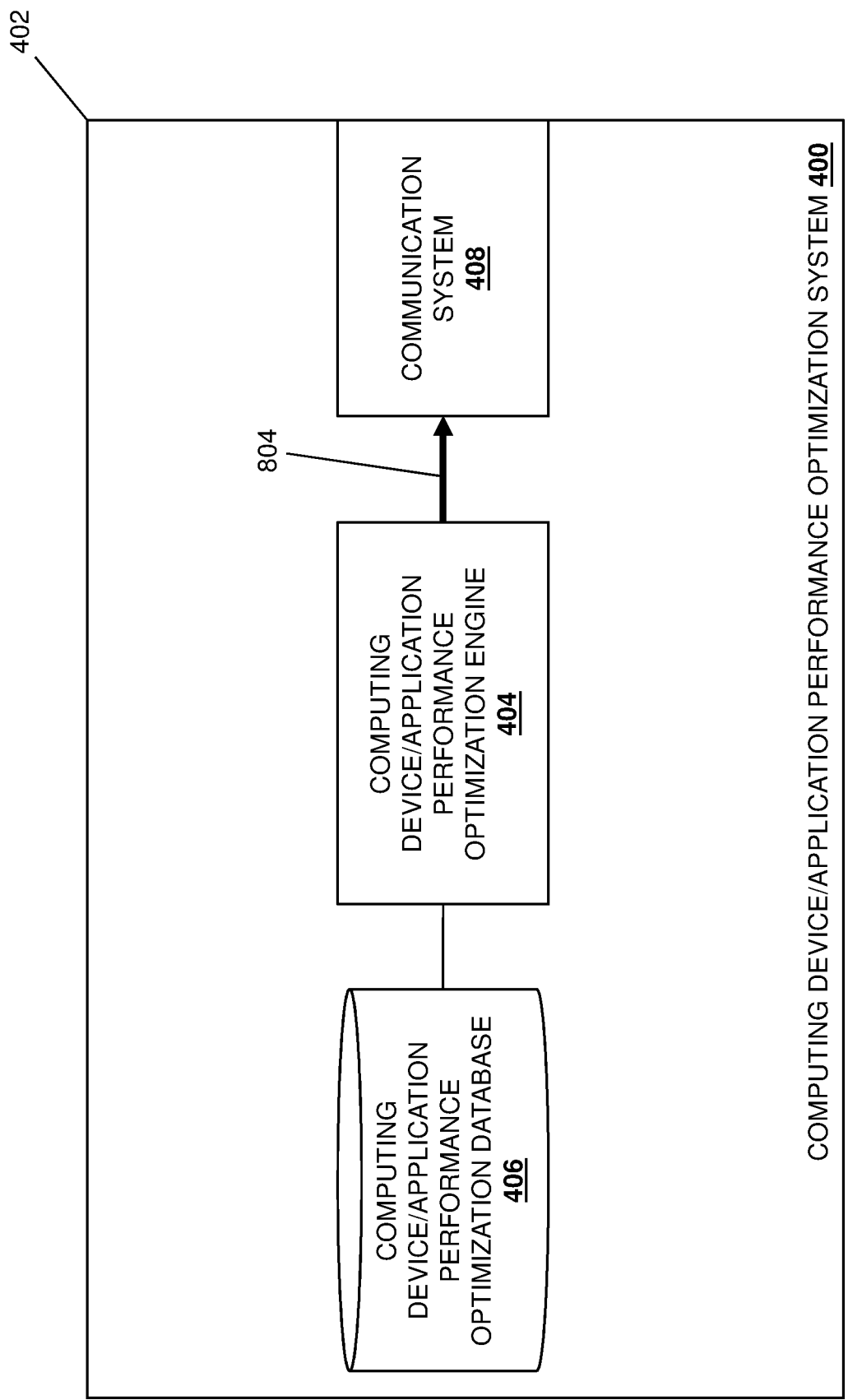
FIG. 8E is a schematic view illustrating an embodiment of the computing device/application performance optimization system of FIG. 4 operating during the method of FIG. 5.
Figure 8F:
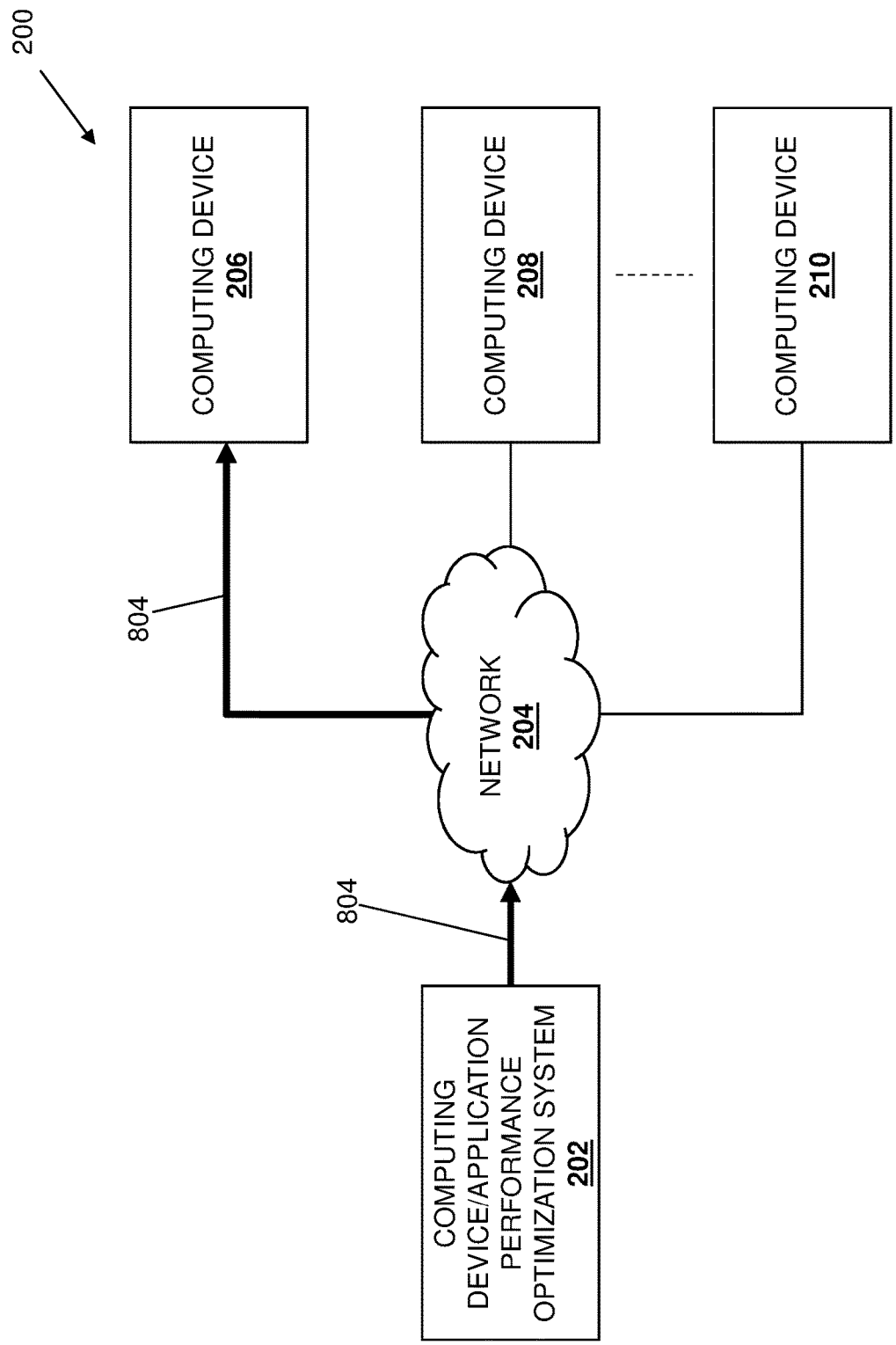
FIG. 8F is a schematic view illustrating an embodiment of the networked system of FIG. 2 operating during the method of FIG. 5.
Figure 8G:
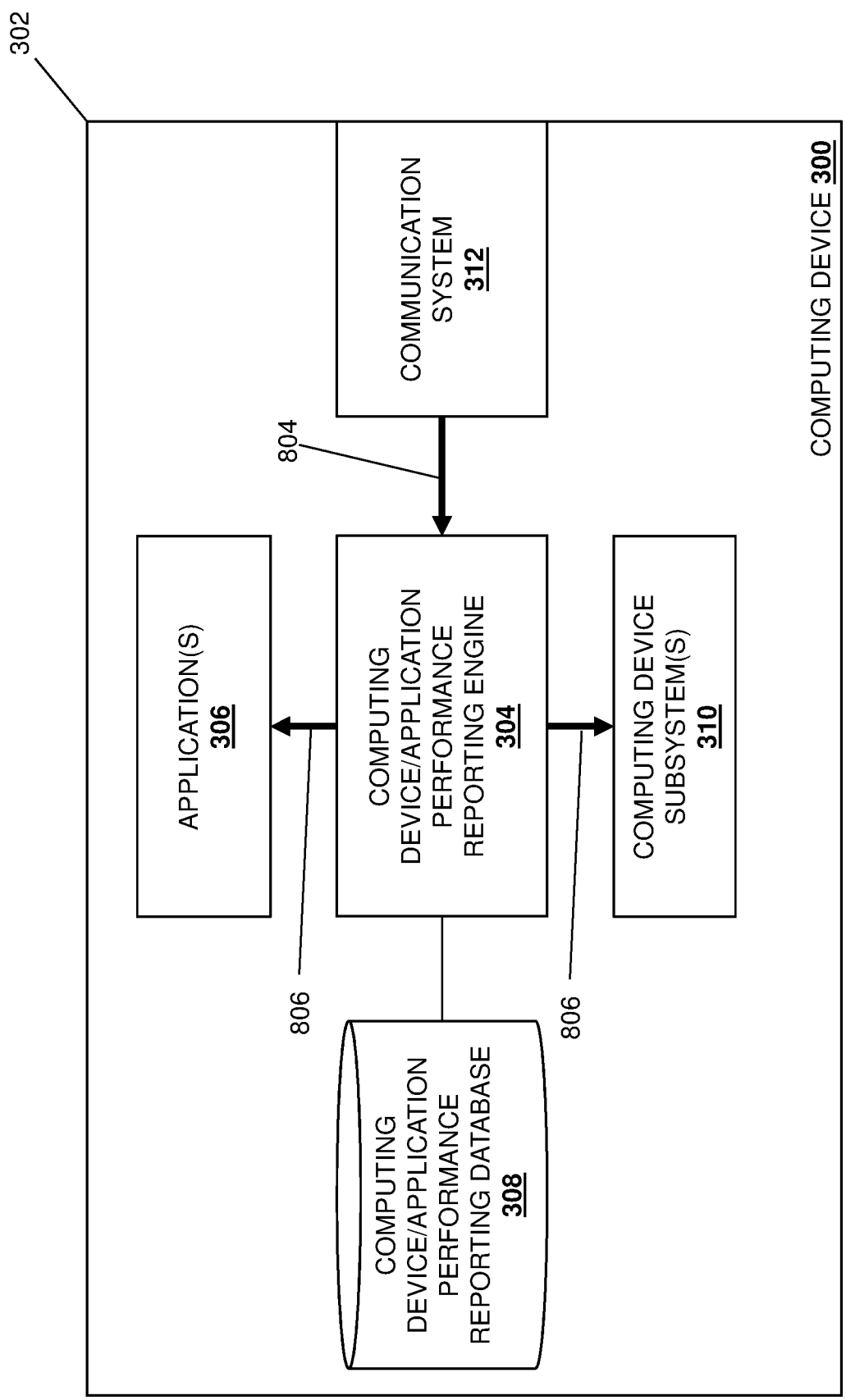
FIG. 8G is a schematic view illustrating an embodiment of the computing device of FIG. 3 operating during the method of FIG. 5.

The method 500 then proceeds to block 510 where the computing device/application performance optimization system transmits the first computing device configuration communication(s) to the first computing device(s). With reference to FIGS. 8E, 8F, and 8G, in an embodiment of block 510, the computing device/application performance optimization engine 404 in the computing device/application performance optimization system 202/400 may perform computing device configuration communication transmission operations 804 to transmit the computing device configuration communication generated at block 508 via its communication system 408 and through the network 204 to the computing device 206/300 such that the computing device/application performance reporting engine 304 receives that computing device configuration communication via its communication system 312. In a specific example, the computing device/application performance optimization engine 404 in the computing device/application performance optimization system 202/400 may transmit the computing device configuration communication via the application, a portal tunnel, a virtual machine, and/or using a variety of other secure communication techniques that would be apparent to one of skill in the art in possession of the present disclosure.

As discussed above, in some embodiments the computing device configuration communication received by the computing device/application performance reporting engine 304 in the computing device 206/300 may include recommended component changes and/or recommended settings changes, and the computing device/application performance reporting engine 304 in the computing device 206/300 may handle those recommended component changes and/or recommended settings changes in a variety of manners. For example, in some embodiments the computing device/application performance reporting engine 304 in the computing device 206/300 may provide the recommended component changes and/or recommended settings changes for display on a display device (not illustrated, but which may be provided by the display 110 discussed above with reference to FIG. 1). As such, upon installation of the application 306, launch of the application 306, during provision of the application 306, or subsequent to provisioning of the application 306, the recommended component changes and/or recommended settings changes may be provided for display to the user of the computing device 206/300 (e.g., a displayed message stating "we have determined that you may enhance the performance of this application by upgrading your video card to Video Card X and changing your CPU settings to enable turbo and hyperthreading".) In a specific example, for recommended component changes, hyperlinks to webpages may be displayed that allow for the purchase of new components along with the recommended component changes.

Furthermore, in some embodiments the computing device/application performance reporting engine 304 in the computing device 206/300 may provide for the implementation the recommended settings changes. As such, upon installation of the application 306, launch of the application 306, during provision of the application 306, or subsequent to provisioning of the application 306, the recommended settings changes may be provided for display to the user of the computing device 206/300 with an option to implement those settings changes (e.g., a displayed message stating "we have determined that you may enhance the performance of this application by changing your CPU settings to enable turbo and hyperthreading—select 'CHANGE' to enable CPU TURBO and CPU HYPERTHREADING".)

Further still, a user of the computing device 206/300 may configure the computing device/application performance reporting engine 304 in the computing device 206/300 to automatically implement any recommended changes received from the computing device/application performance optimization system 202/400 and, as such, the computing device/application performance reporting engine 304 in the computing device 206/300 may automatically implement recommended settings changes included in a computing device configuration communication received from the computing device/application performance optimization system 202/400, and/or may automatically purchase components identified in recommended component changes included in a computing device configuration communication received from the computing device/application performance optimization system 202/400.

As such, as illustrated in FIG. 8G and in some embodiments in response to receiving the computing device configuration communication as part of the computing device configuration communication transmission operations 804, the computing device/application performance reporting engine 304 in the computing device 206/300 may perform computing device configuration operations 806 that may include configuring application settings of the application 306, configuration computing device settings for the computing device subsystem(s) 310, and/or perform any other configuration operations that one of skill in the art in possession of the present disclosure will appreciate may be defined by the computing device/application performance profile to reconfigure the computing device 206/300 in order to allow it to provide the application 306 at a relatively higher performance level.

Thus, systems and methods have been described that provide for the analysis of the provisioning of an gaming application by a plurality of different second gaming computers having different second gaming computer configurations in order to generate a gaming computer/application performance profile that identifies the gaming computer configuration that provides for the best performance of that gaming application, which allows first gaming computer(s) that are identified as being configured to provide that gaming application (e.g., that have installed that gaming application) to have their first gaming computer configuration analyzed in consideration of the gaming computer/application performance profile in order to determine one or more gaming computer configuration changes for those first gaming computer(s) that will optimize the performance of that gaming application by those first gaming computer(s).

For example, the networked system of the present disclosure may include a first gaming computer, second gaming computers, and a gaming computer/application performance optimization system that are all coupled to a network. The gaming computer/application performance optimization system receives second gaming computer configuration information for each second gaming computer while they provided a gaming application, and second gaming computer performance information generated by each second gaming computer in response to providing the gaming application, and uses them to generate a gaming computer/application performance profile. When the gaming computer/application performance optimization system determines that the first gaming computer is configured to provide the gaming application, it generates a first gaming computer configuration communication that includes at least one first configuration change to a first gaming computer configuration for the first gaming computer based on the first gaming computer/application performance profile, and transmits the first gaming computer configuration communication to the first gaming computer.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A networked system, comprising:
a network;
a first computing device that is coupled to the network;
a plurality of second computing devices that are coupled to the network; and
a computing device/application performance optimization system that is coupled to the network and that is configured to:
receive, via the network from each of a first subset of the plurality of second computing devices, respective second computing device configuration information for that second computing device while that second computing device provided a first application, and respective second computing device performance information generated by that second computing device in response to that second computing device providing the first application;
generate, using the second computing device configuration information for the first subset of the plurality of second computing devices while the first subset of the plurality of second computing devices provided the first application and the second computing device performance information generated by the first subset of the plurality of second computing devices in response to the first subset of the plurality of second computing devices providing the first application, a first computing device/application performance profile;
determine, via the network, that the first computing device is configured to provide the first application;
generate, based on the first computing device/application performance profile and in response to determining that the first computing device is configured to provide the first application, a first computing device configuration communication that includes at least one first configuration change to a first computing device configuration for the first computing device; and
transmit, via the network to the first computing device, the first computing device configuration communication.

2. The system of claim 1, wherein the computing device/application performance optimization system is configured to:
store, in a database, the second computing device configuration information for the first subset of the plurality of second computing devices while the first subset of the plurality of second computing devices provided the first application and the second computing device performance information generated by the first subset of the plurality of second computing devices in response to the first subset of the plurality of second computing devices providing the first application.

3. The system of claim 2, wherein the computing device/application performance optimization system is configured to:
perform at least one machine-learning operation using:
the second computing device configuration information for the first subset of the plurality of second computing devices while the first subset of the plurality of second computing devices provided the first application that are stored in the database; and
the second computing device performance information generated by the first subset of the plurality of second computing devices in response to the first subset of the plurality of second computing devices providing the first application and that is stored in the database,
wherein the first computing device/application performance profile is generated based on the performance of the at least one machine-learning operation.

4. The system of claim 1, wherein the first computing device configuration communication is configured to automatically provide the at least one first configuration change to the first computing device configuration for the first computing device.

5. The system of claim 1, further comprising:
a third computing device that is coupled to the network, wherein the computing device/application performance optimization system is configured to:
determine, via the network, that the third computing device is configured to provide the first application;
generate, based on the first computing device/application performance profile and in response to determining that the third computing device is configured to provide the first application, a second computing device configuration communication that includes at least one second configuration change to a third computing device configuration for the third computing device; and
transmit, via the network to the third computing device, the second computing device configuration communication.

6. The system of claim 1, wherein the computing device/application performance optimization system is configured to:
receive, via the network from each of a second subset of the plurality of second computing devices, respective second computing device configuration information for that second computing device while that second computing device provided a second application, and respective second computing device performance information generated by that second computing device in response to that second computing device providing the second application;
generate, using the second computing device configuration information for the second subset of the plurality of second computing devices while the second subset of the plurality of second computing devices provided the second application and the second computing device performance information generated by the second subset of the plurality of second computing devices in response to the second subset of the plurality of second computing devices providing the second application, a second computing device/application performance profile;
determine, via the network, that the first computing device is configured to provide the second application;
generate, based on the second computing device/application performance profile and in response to determining that the first computing device is configured to provide the second application, a second computing device configuration communication that includes at least one second configuration change to the first computing device configuration for the first computing device; and
transmit, via the network to the first computing device, the second computing device configuration communication.

7. An Information Handling System (IHS), comprising:
a processing system; and
a memory system that is coupled to the processing system and that includes instructions that, when executed by the processing system, cause the processing system to provide a computing device/application performance optimization engine that is configured to:
receive, from each of a first subset of a plurality of second computing devices, respective second computing device configuration information for that second computing device while that second computing device provided a first application, and respective second computing device performance information generated by that second computing device in response to that second computing device providing the first application;
generate, using the second computing device configuration information for the first subset of the plurality of second computing devices while the first subset of the plurality of second computing devices provided the first application and the second computing device performance information generated by the first subset of the plurality of second computing devices in response to the first subset of the plurality of second computing devices providing the first application, a first computing device/application performance profile;

determine that a first computing device is configured to provide the first application;

generate, based on the first computing device/application performance profile and in response to determining that the first computing device is configured to provide the first application, a first computing device configuration communication that includes at least one first configuration change to a first computing device configuration for the first computing device; and transmit, to the first computing device, the first computing device configuration communication.

8. The IHS of claim 7, wherein the computing device/application performance optimization engine is configured to:

store, in a database, the second computing device configuration information for the first subset of the plurality of second computing devices while the first subset of the plurality of second computing devices provided the first application and the second computing device performance information generated by the first subset of the plurality of second computing devices in response to the first subset of the plurality of second computing devices providing the first application.

9. The IHS of claim 8, wherein the computing device/application performance optimization engine is configured to:

perform at least one machine-learning operation using:
the second computing device configuration information for the first subset of the plurality of second computing devices while the first subset of the plurality of second computing devices provided the first application that are stored in the database; and
the second computing device performance information generated by the first subset of the plurality of second computing devices in response to the first subset of the plurality of second computing devices providing the first application and that is stored in the database,
wherein the first computing device/application performance profile is generated based on the performance of the at least one machine-learning operation.

10. The IHS of claim 7, wherein the first computing device configuration communication is configured to automatically provide the at least one first configuration change to the first computing device configuration for the first computing device.

11. The IHS of claim 7, wherein the computing device/application performance optimization engine is configured to:

determine that a third computing device is configured to provide the first application;

generate, based on the first computing device/application performance profile and in response to determining that the third computing device is configured to provide the first application, a second computing device configuration communication that includes at least one second configuration change to a third computing device configuration for the third computing device; and transmit, to the third computing device, the second computing device configuration communication.

12. The IHS of claim 7, wherein the computing device/application performance optimization engine is configured to:

receive, from each of a second subset of the plurality of second computing devices, respective second computing device configuration information for that second computing device while that second computing device provided a second application, and respective second computing device performance information generated by that second computing device in response to that second computing device providing the second application;

generate, using the second computing device configuration information for the second subset of the plurality of second computing devices while the second subset of the plurality of second computing devices provided the second application and the second computing device performance information generated by the second subset of the plurality of second computing devices in response to the second subset of the plurality of second computing devices providing the second application, a second computing device/application performance profile;

determine that the first computing device is configured to provide the second application;

generate, based on the second computing device/application performance profile and in response to determining that the first computing device is configured to provide the second application, a second computing device configuration communication that includes at least one second configuration change to the first computing device configuration for the first computing device; and transmit, to the first computing device, the second computing device configuration communication.

13. The IHS of claim 7, wherein the determining that the first computing device is configured to provide the first application includes:

determining that the first application has been installed on the first computing device.

14. A method for operating performance of an application by a computing device, comprising:

receiving, by a computing device/application performance optimization system from each of a first subset of a plurality of second computing devices, respective second computing device configuration information for that second computing device while that second computing device provided a first application, and respective second computing device performance information generated by that second computing device in response to that second computing device providing the first application;

generating, by the computing device/application performance optimization system using the second computing device configuration information for the first subset of the plurality of second computing devices while the first subset of the plurality of second computing devices provided the first application and the second computing device performance information generated by the first subset of the plurality of second computing devices in response to the first subset of the plurality of second computing devices providing the first application, a first computing device/application performance profile;

determining, by the computing device/application performance optimization system, that a first computing device is configured to provide the first application;

generating, by the computing device/application performance optimization system based on the first computing device/application performance profile and in response to determining that the first computing device is configured to provide the first application, a first computing device configuration communication that includes at least one first configuration change to a first computing device configuration for the first computing device; and transmitting, by the computing device/application performance optimization system to the first computing device, the first computing device configuration communication.

15. The method of claim 14, further comprising:
storing, by the computing device/application performance optimization system in a database, the second computing device configuration information for the first subset of the plurality of second computing devices while the first subset of the plurality of second computing devices provided the first application and the second computing device performance information generated by the first subset of the plurality of second computing devices in response to the first subset of the plurality of second computing devices providing the first application.

16. The method of claim 15, further comprising:
performing, by the computing device/application performance optimization system, at least one machine-learning operation using:
  the second computing device configuration information for the first subset of the plurality of second computing devices while the first subset of the plurality of second computing devices provided the first application that are stored in the database; and
  the second computing device performance information generated by the first subset of the plurality of second computing devices in response to the first subset of the plurality of second computing devices providing the first application and that is stored in the database,
wherein the first computing device/application performance profile is generated based on the performance of the at least one machine-learning operation.

17. The method of claim 14, wherein the first computing device configuration communication is configured to automatically provide the at least one first configuration change to the first computing device configuration for the first computing device.

18. The method of claim 14, further comprising:
determining, by the computing device/application performance optimization system, that a third computing device is configured to provide the first application;
generating, by the computing device/application performance optimization system based on the first computing device/application performance profile and in response to determining that the third computing device is configured to provide the first application, a second computing device configuration communication that includes at least one second configuration change to a third computing device configuration for the third computing device; and
transmitting, by the computing device/application performance optimization system to the third computing device, the second computing device configuration communication.

19. The method of claim 14, further comprising:
receiving, by the computing device/application performance optimization system from each of a second subset of the plurality of second computing devices, respective second computing device configuration information for that second computing device while that second computing device provided a second application, and respective second computing device performance information generated by that second computing device in response to that second computing device providing the second application;
generating, by the computing device/application performance optimization system using the second computing device configuration information for the second subset of the plurality of second computing devices while the second subset of the plurality of second computing devices provided the second application and the second computing device performance information generated by the second subset of the plurality of second computing devices in response to the second subset of the plurality of second computing devices providing the second application, a second computing device/application performance profile;
determining, by the computing device/application performance optimization system, that the first computing device is configured to provide the second application;
generating, by the computing device/application performance optimization system based on the second computing device/application performance profile and in response to determining that the first computing device is configured to provide the second application, a second computing device configuration communication that includes at least one second configuration change to the first computing device configuration for the first computing device; and
transmitting, by the computing device/application performance optimization system to the first computing device, the second computing device configuration communication.

20. The method of claim 14, wherein the determining that the first computing device is configured to provide the first application includes:
determining that the first application has been installed on the first computing device.

* * * * *

UNITED STATES PATENT AND TRADEMARK OFFICE
CERTIFICATE OF CORRECTION

| | | |
|---|---|---|
| PATENT NO. | : 11,513,936 B2 | Page 1 of 1 |
| APPLICATION NO. | : 17/243777 | |
| DATED | : November 29, 2022 | |
| INVENTOR(S) | : North et al. | |

It is certified that error appears in the above-identified patent and that said Letters Patent is hereby corrected as shown below:

In the Specification

Column 9, Lines 9-10, "U.S. patent application Ser. No. 14/243,702" should be changed to
--U.S. patent application Ser. No. 17/243,702--

Signed and Sealed this
Seventh Day of February, 2023

Katherine Kelly Vidal
Director of the United States Patent and Trademark Office